(12) United States Patent
DeKyspotter et al.

(10) Patent No.: US 12,123,537 B2
(45) Date of Patent: Oct. 22, 2024

(54) MOBILE SYSTEM FOR PIPE REHABILITATION

(71) Applicant: INA ACQUISITION CORP., Wilmington, DE (US)

(72) Inventors: Arnaud DeKyspotter, Plerin (FR); Dominique Botrel, Saint-Brieuc (FR); James O'Brien, Troy, MO (US); Guy Gordon, Dardenne Prairie, MO (US)

(73) Assignee: INA Acquisition Corp., Wilmington, DE (US)

( * ) Notice: Subject to any disclaimer, the term of this patent is extended or adjusted under 35 U.S.C. 154(b) by 361 days.

(21) Appl. No.: 17/669,067

(22) Filed: Feb. 10, 2022

(65) Prior Publication Data

US 2022/0252200 A1 Aug. 11, 2022

Related U.S. Application Data

(60) Provisional application No. 63/148,230, filed on Feb. 11, 2021.

(51) Int. Cl.
*F16L 55/30* (2006.01)
*E03F 3/06* (2006.01)
(Continued)

(52) U.S. Cl.
CPC ............ *F16L 55/30* (2013.01); *E03F 3/06* (2013.01); *F16L 55/265* (2013.01); *E03F 2003/065* (2013.01); *F16L 2101/10* (2013.01)

(58) Field of Classification Search
CPC . F16L 55/18; F16L 55/11; F16L 55/12; F16L 55/1645; F16L 55/40; F16L 55/48; F16L 55/30; F16L 55/265; F16L 2101/10
(Continued)

(56) References Cited

U.S. PATENT DOCUMENTS 4,197,908 A * 4/1980 Davis ..................... E03F 3/06
166/50
4,986,314 A * 1/1991 Himmler ............. F16L 55/1645
166/55.7
(Continued)

FOREIGN PATENT DOCUMENTS

EP 2614287 B1 3/2018
EP 2245355 B1 7/2018
(Continued)

*Primary Examiner* — Patrick F Brinson
(74) *Attorney, Agent, or Firm* — Stinson LLP (57) ABSTRACT

In a mobile system for pipe rehabilitation, a tractor moves a motorized electrical cutter inside a pipe. The cutter is used to remove a blockage from a branch conduit connected to the main pipe. A power management system powers the mobile system, including the cutter, from a direct current power source with an input current having a voltage less than 60V. The power management system powers the electrical cutter by discharging current from the supercapacitor module to the cutter. Power to other components is provided without discharge from the supercapacitor module and is not interrupted by supercapacitor discharge to the cutter. The power management system can include a housing for the supercapacitor module with a first connector at one end for connecting to an umbilical cord and a second connector an opposite end for connecting to the tractor.

20 Claims, 6 Drawing Sheets

(51) Int. Cl.
*F16L 55/26* (2006.01)
*F16L 101/10* (2006.01)

(58) Field of Classification Search
USPC ........ 138/97, 98, 92, 94; 409/132, 143, 134; 407/30; 451/69, 71; 408/22
See application file for complete search history.

(56) References Cited

U.S. PATENT DOCUMENTS

| | | | | |
|---|---|---|---|---|
| 5,088,553 | A * | 2/1992 | Ralston | F16L 55/18 |
| | | | | 407/56 |
| 5,105,882 | A * | 4/1992 | Ralston | B23B 51/105 |
| | | | | 408/1 R |
| 5,368,423 | A * | 11/1994 | Hanna | E03F 3/06 |
| | | | | 166/55.7 |
| 5,520,569 | A * | 5/1996 | Endoh | B23B 51/105 |
| | | | | 451/6 |
| 6,056,017 | A * | 5/2000 | Kamiyama | B29C 63/0086 |
| | | | | 264/269 |
| 6,651,699 | B2 * | 11/2003 | Kweon | F16L 55/179 |
| | | | | 264/269 |
| 7,131,791 | B2 * | 11/2006 | Whittaker | G01M 3/005 |
| | | | | 405/184.2 |
| 7,720,570 | B2 * | 5/2010 | Close | B25J 9/1617 |
| | | | | 405/184.2 |
| 8,015,695 | B2 * | 9/2011 | Polivka | F16L 55/265 |
| | | | | 29/402.09 |
| 8,060,257 | B2 * | 11/2011 | Close | B25J 9/1617 |
| | | | | 405/184.2 |
| 8,402,911 | B1 | 3/2013 | Weisenberg | |
| 9,016,322 | B2 * | 4/2015 | Vogt | F16L 55/265 |
| | | | | 138/97 |
| 9,255,806 | B2 * | 2/2016 | Spering | F16L 55/265 |
| 9,383,055 | B2 | 7/2016 | Hirose et al. | |
| 9,446,455 | B2 | 9/2016 | Gagnon et al. | |
| 9,494,270 | B2 | 11/2016 | Cain et al. | |
| 9,512,952 | B2 | 12/2016 | Rogers | |
| 11,391,407 | B2 * | 7/2022 | Baxter | E03B 7/006 |
| 2005/0103538 | A1 | 5/2005 | Cotton | |
| 2011/0155273 | A1 * | 6/2011 | Cain | F16L 55/265 |
| | | | | 138/97 |
| 2017/0307127 | A1 | 10/2017 | Langdale et al. | |

FOREIGN PATENT DOCUMENTS

| | | |
|---|---|---|
| KR | 101313240 B1 | 9/2013 |
| WO | 2007055586 A1 | 5/2007 |
| WO | 2016062660 A1 | 4/2016 |
| WO | 2017168318 A1 | 10/2017 |

\* cited by examiner

Prior Art

Prior Art

MOBILE SYSTEM FOR PIPE REHABILITATION

CROSS-REFERENCE TO RELATED APPLICATION

This application claims priority to U.S. Provisional Patent Application Ser. No. 63/148,230, filed Feb. 11, 2021, and entitled Mobile System for Pipe Rehabilitation, which is hereby incorporated by reference in its entirety for all purposes.

FIELD

This disclosure generally relates to a mobile system for pipe rehabilitation that includes an electric cutter and a power management system for powering the electric cutter and other components of the mobile system for pipe rehabilitation.

BACKGROUND

Figure 1A:
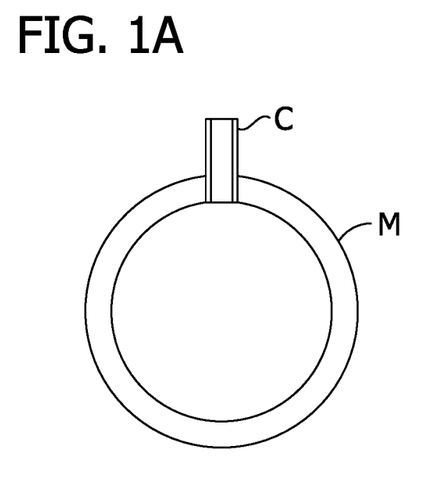
FIG. 1A is a schematic illustration of a main pipe and branch conduit.

Referring to FIG. 1A, in various pipe systems that carry fluid (e.g., gravity sewer systems, municipal water systems, service water systems, waste water systems, industrial processes, etc.), it is common for a main pipe M to be fluidly coupled to one or more branch conduits C (e.g., user connections). In a sewer system, a sewer main M is connected to a plurality of lateral pipes C that drain from individual users into the main. In a water distribution system, a water main M can be coupled to a plurality of corporation stops C that provide connections to water service lines. Over the life of a sewer pipe system or a pressure pipe system, it may become necessary to rehabilitate or repair the main pipe M.

Figure 1B:
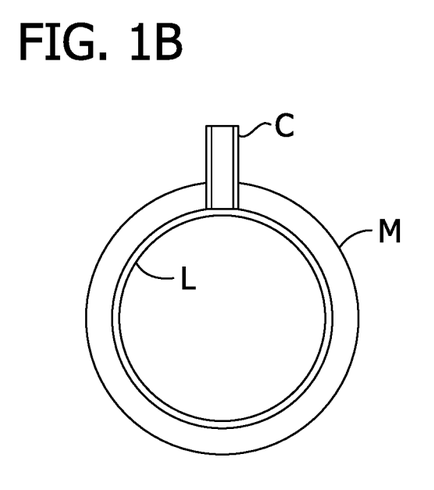
FIG. 1B is a schematic illustration of a sewer main lined with a CIPP liner.
Figure 1C:
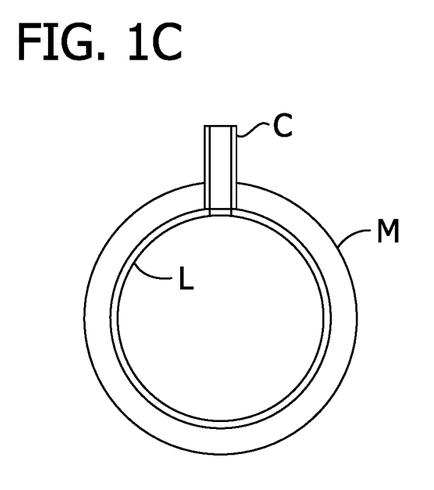
FIG. 1C is a schematic illustration of fluid communication between the sewer main and a lateral pipe being restored after the sewer main is lined with the liner.

Referring to FIGS. 1B and 1C, one technique for rehabilitating a sewer main comprises installing a cured-in-place pipe (CIPP) liner L along the main pipe P. The installed liner L initially blocks the connections to the lateral pipes C. So after the liner L has been put in place and installed, the fluid communication between the main pipe M and the service laterals C must be restored. As shown in FIG. 1C, holes are formed in the liner L at the service laterals C to restore fluid communication. For example, fluid communication can be established by a robot that travels through the interior of the main pipe M carrying a tool for forming holes in the liner L.

Figure 1D:
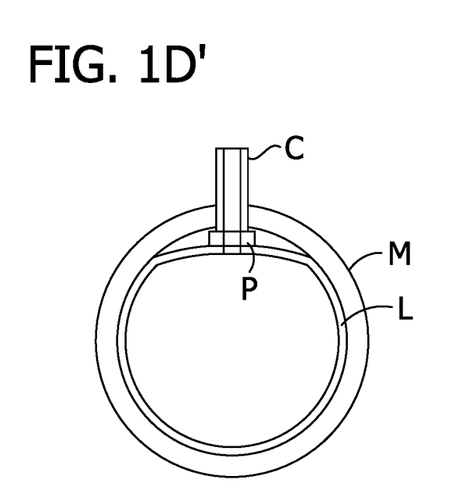
FIG. 1D' is a schematic illustration of the fluid communication between the water main and the corporation stop being restored after the corporation stop has been plugged and the main pipe has been lined.

A conventional sequence of steps for rehabilitating a water main M under pressure is illustrated schematically in FIGS. 1B'-1D'. Before positioning the liner L in the main pipe M, the openings to the corporation stops C are sealed with plugs P (FIG. 1B). The plugs P comprise fittings that are installed in the corporation stops C from within the main pipe M. Subsequently, a CIPP liner is installed in the main pipe M (FIG. 1C). The plugs P prevent resin in the liner L from entering the corporation stops C as the liner is pressed outwardly against the wall of the main pipe M and cured. After installation of the liner L is complete, holes are formed in the liner and portions of the plugs P are removed to restore fluid communication between the rehabilitated main pipe M and the corporation stops C. For example, fluid communication can be established by a robot that travels through the interior of the main pipe M carrying a tool for forming holes in the liner L.

This disclosure pertains to improvements in the devices, systems, and methods used to form holes in a liner L for restoring fluid communication between a main pipe M and its branch conduits C. An exemplary application for the devices, systems, and methods described herein is restoring fluid communication between a sewer main M and its lateral conduits C as shown in FIGS. 1B and 1C. In addition, the devices systems and methods of the present disclosure are suitable for us in restoring fluid communication between a water main M or other pressure pipe and its corporation stops C or other service connections, as shown in FIGS. 1B'-1D'.

SUMMARY

In one aspect, a mobile system for pipe rehabilitation comprises a tractor configured for moving along a main pipe. A cutter is supported by the tractor for movement with the tractor along the main pipe. The cutter comprises a cutting shaft configured to mount a cutting bit and an electrical motor configured to drive rotation of the cutting shaft about a rotational axis such that the cutting shaft can rotate the cutting bit to remove a blockage from a branch conduit connected to the main pipe. A power management system is in electrical communication with at least the cutter. The power management system comprises a supercapacitor module including at least one supercapacitor. The power management system is configured to selectively power the electrical motor to drive rotation of the cutting shaft about a rotational axis by discharging current from the supercapacitor module to the cutter.

In another aspect, a power management system provides electrical power to a mobile system configured for pipe rehabilitation. The mobile system comprises a tractor and a cutter. The power management system comprises a housing. a first electrical coupling on the housing is configured to electrically connect the power management system to an umbilical cord carrying an input current. A second electrical coupling on the housing is configured to couple to the mobile system for providing a drive current to at least the cutter of the mobile system. A supercapacitor module is received in the housing. The supercapacitor module includes at least one supercapacitor. The power management system is configured to charge the supercapacitor module with the input current and selectively power the cutter by discharging current from the supercapacitor module to the cutter.

In another aspect, a mobile system for pipe rehabilitation comprises a tractor configured for moving along a main pipe. A cutter is supported by the tractor for movement with the tractor along the main pipe. The cutter comprises a cutting shaft configured to mount a cutting bit and an electrical motor configured to drive rotation of the cutting shaft about a rotational axis such that the cutting bit when mounted on the cutting shaft can remove a blockage from a branch conduit connected to the main pipe. A power management system is in electrical communication with at least the cutter. The power management system is configured to connect to a direct current power source that provides an input current having a voltage of less than 60V and to power the electrical motor from said input current.

Other aspects and features will be apparent hereinafter.

BRIEF DESCRIPTION OF THE DRAWINGS

FIG. 1B' is a schematic illustration of a corporation stop connected to a water main plugged by a plug;

FIG. 1C' is a schematic illustration of the water main of FIG. 1B' lined by a CIPP liner;

DETAILED DESCRIPTION

U.S. Patent Application Publication No. 2020/0173599, which is hereby incorporated by reference in its entirety, describes an exemplary system and method for rehabilitating host pipes that are connected to branch conduits, e.g., corporation stops. In particular, U.S. Patent Application Publication No. 2020/0173599 discloses an exemplary cutting tool 1060 which may be used to restore fluid communication between a main pipe and branch conduit after the main pipe has been lined with a CIPP liner. Cutting tools of the type disclosed in U.S. Patent Application Publication No. 2020/0173599 are known to either run on an electrical motor or a pneumatic drive.

In conventional systems for rehabilitating pipes of the type disclosed in U.S. Patent Application Publication No. 2020/0173599, electrical power and/or compressed air is delivered directly to components of the robotic system inside the pipe via an umbilical cord that caries power from a source (e.g., a gas-powered generator, an air compressor) located outside the pipe. The inventors have recognized a need to improve the way that power is delivered over an umbilical cord to robotic systems inside a pipe. More particularly, the inventors have recognized that cutting tools of the type disclosed in U.S. Patent Application Publication No. 2020/0173599 require substantial power to remove portions of the liner L (and, in some cases, the plugs P) for restoring fluid communication between a main pipe M and its branch conduits C. Conventional electrical cutting tools require a dedicated high voltage (e.g., 230 V) electrical line along the umbilical cord to provide enough electrical power to prevent the tool from stalling during use. In the typical configuration, a very heavy Siamese cable is used with a dedicated electrical line for the cutting tool. This high voltage along the umbilical cord creates an electrical shock hazard at the worksite, and furthermore, the heavy Siamese cable can be difficult for the robot system to maneuver through the main pipe M. Similarly, when compressed air is used to power a cutting tool, the robotic system requires a large, heavy umbilical cord that can be difficult to maneuver through the main pipe. Furthermore, the inventors believe that pneumatic cutting tools are less efficient than electrical cutting tools.

Figure 2:
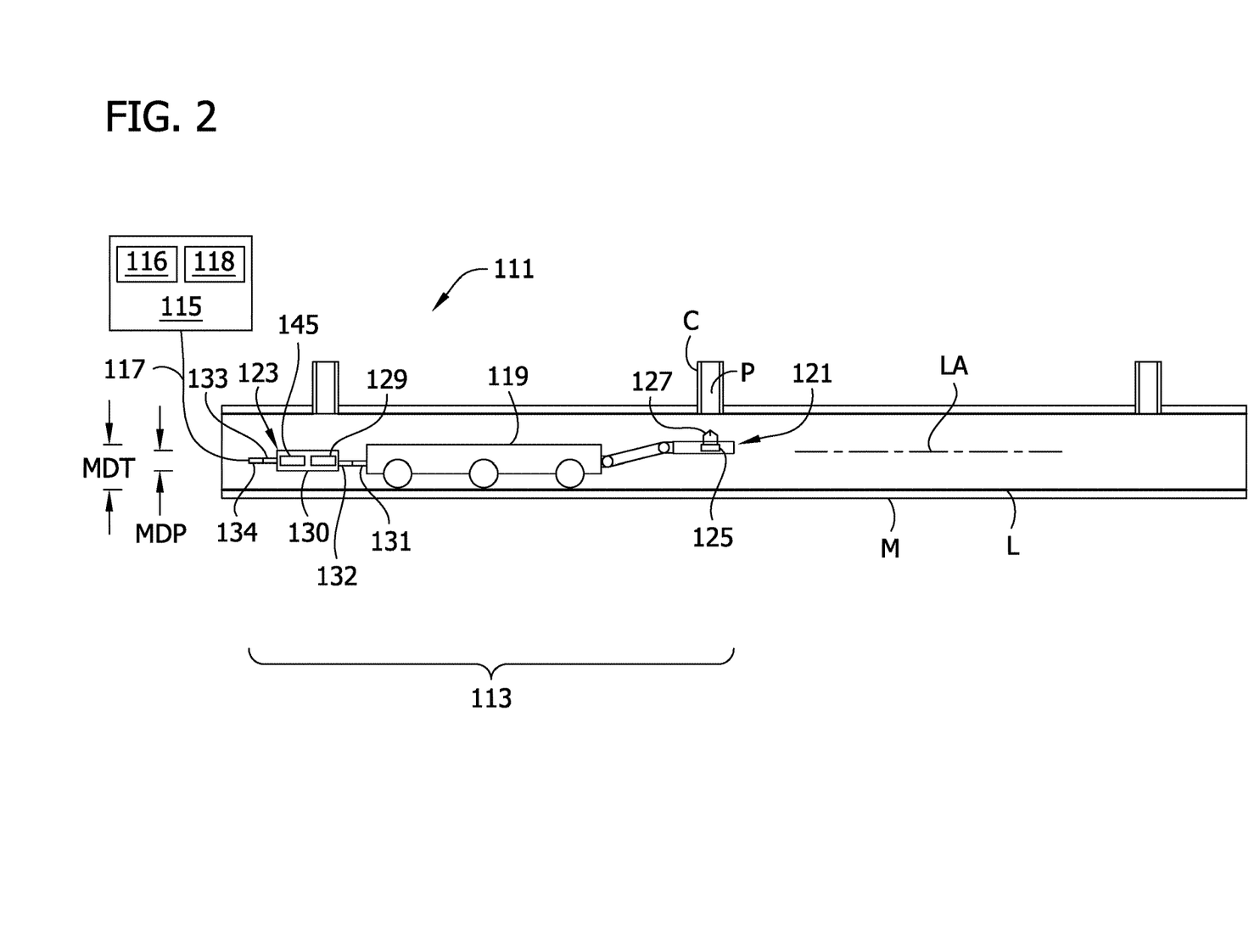
FIG. 2 is a schematic illustration of a pipe rehabilitation system being used to remove a portion of a plug after a main pipe is lined with a CIPP liner.

Referring to FIG. 2, an exemplary embodiment of a pipe rehabilitation system in the scope of the present disclosure is generally indicated at reference number 111. The pipe rehabilitation system 111 comprises a mobile system 113 for use inside the main pipe M and a stationary control skid 115 located outside of the pipe. An umbilical cord 117 connects the mobile system 113 to the control skid 115. The entire mobile system 113 is movable inside the pipe M and relative to the control skid 115. In the illustrated embodiment, the control skid 115 comprises one or more power sources, such as an electrical power source (e.g., a gas-powered electric generator) 116 and an air compressor 118. The umbilical cord 117 operatively connects the power source(s) to the mobile system 113.

The mobile system 113 generally comprises a tractor 119 configured for moving along a main pipe, an electric cutter 121 (broadly, cutting tool) supported by the tractor for movement with the tractor along the main pipe, and a power management system 123 in electrical communication with at least the cutter. It will be appreciated that the electric cutter 121 may be interchangeable with other robotic tools as disclosed in U.S. Patent Application Publication No. 2020/0173599. An exemplary embodiment of the tractor 119 (including associated drive mechanisms, tool positioning mechanisms, and pipe visualization systems) is described in further detail in U.S. Patent Application Publication No. 2020/0173599. The cutter 121 generally comprises a cutting shaft (not shown) configured to mount a cutting bit 127, and an electrical motor 125 configured to drive rotation of the cutting shaft about a rotational axis such that the cutting shaft can rotate the cutting bit to remove a blockage from a branch conduit C connected to the main pipe M. In particular, the cutter 121 may be used in substantially the same manner as the cutting tool 24 of U.S. Patent Application Publication No. 2020/0173599 to remove portions of a liner L (and in some cases portions of a plug P) from a junction between a branch conduit C and a main pipe M to restore fluid communication between the branch conduit and the main pipe after the main pipe is lined with the liner.

In general, the power management system 123 is configured to store electrical power delivered from the power source 115 to the mobile system 113 over the umbilical cord 117 in an electrical storage device 129 and selectively discharge the stored power to the cutter 121 when used to remove a blockage from a branch conduit. In one or more embodiments, the power management system is configured to communicate with the power source 115 and the mobile system 113 over a CAN communication bus. Hence, the power management system 123 suitably comprises a CAN bus isolator. In an exemplary embodiment, the power management system 123 is configured to communicate with the power source 115 via a first CAN bus and is configured to communicate with the mobile system 113 via a second CAN bus.

The power management system is configured to connect to a direct current power source 116 that provides an input current having a voltage of less than 60V and to power the electrical motor 125 using this input current. In an exemplary embodiment, the input current has a voltage of less than 60V (e.g., about 54V). As those skilled in the art will appreciate, this minimizes the perceived safety risk of the electrical current passing along the umbilical cord. In addition to powering the cutter 121 via power from the power source 116, the illustrated power management system 123 is also configured to power other electrical components supported on the tractor 119, including a tractor drive system, a tool positioning system, and an imaging system associated with the tractor. More particularly, the power management system 123 is configured to power the other electrical components separately from any discharge of current from the power storage device 129. Further, the power management system 123 is configured to power the electrical components without interruption, while discharging current from the power storage device 129 to power the cutter 125. In the illustrated embodiment, the umbilical cord 117 comprises a single power line that supplies power to both the cutter 121 and the other electrical components of the tractor 119.

Figure 3:
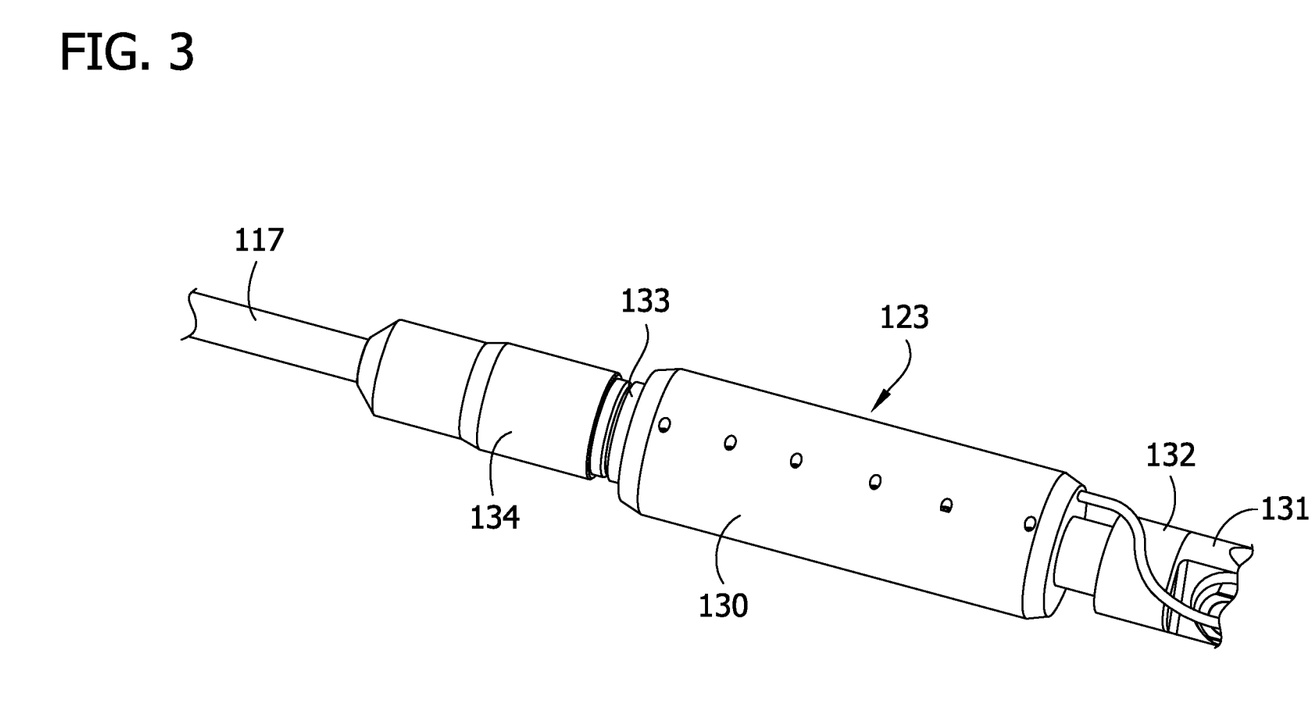
FIG. 3 is a photograph of a power management system of the pipe rehabilitation system coupled to a tractor of the pipe rehabilitation system.

The power management system 123 comprises a housing 130 configured to be supported on the tractor 119 for movement with the tractor along the main pipe M. In the illustrated embodiment, the power management system 123 is connected in series between the umbilical cord 117 and the tractor 119. Further, the mobile system 113 is adapted so that the tractor 119 can be used without the power management system 123 when the cutter 121 is not in use. The tractor 113 has a front end portion and a rear end portion spaced apart along a longitudinal axis LA. Referring to FIGS. 2 and 3, the tractor 113 comprises a first electrical coupling 131 is on the rear end portion. The first electrical coupling 131 (broadly, an input coupling) is configured to couple directly to the tractor 119 for supplying the input current to the mobile system 113. The power management system 123 comprises a second electrical coupling 132 (broadly, an output coupling) configured to couple to the first electrical coupling 131 and a third electrical coupling 133 (broadly, another input coupling) configured to couple to the umbilical cord 117. The input couplings 131, 133 on both the tractor 119 and the power management system 123 are essentially the same, and the output coupling 132 of the power management system is essentially the same as an outlet coupling 134 on the end of the umbilical cord 117. In an exemplary embodiment, connecting the second coupling 132 to the first coupling 131 both (1) establishes an electrical connection between the power management system 123 and the tractor 119 and (2) mounts the power management system on the tractor such that the power management system is supported on the tractor for movement with the tractor along the main pipe M. For example, in the illustrated embodiment, connecting the first and second couplings 131, 132 supports the power management system housing in cantilevered relationship with the tractor 119. In the illustrated embodiment, in addition to the electrical coupling 132, a separate cable (visible in FIG. 3) extends from the power management system 123 to the cutting tool 121 for powering the cutting tool. In other words, there are separate electrical pathways for providing current from the power management system 123 to the tractor 113 and for providing current from the power management system 123 to the cutting tool 121.

The illustrated power management system housing 130 is generally cylindrical. The housing 130 has a maximum cross sectional dimension MDP (e.g., an outer diameter) in a plane perpendicular to the longitudinal axis LA. As shown in FIG. 2, the tractor 113 likewise has a maximum tractor cross-sectional dimension MDT in a plane perpendicular to the longitudinal axis LA. The maximum tractor cross-sectional dimension MDT is suitably greater than the maximum housing cross-sectional dimension MDP. This allows the power management system 123 to be trailered by the tractor 113 through the main pipe M substantially without interfering with the main pipe.

Figure 4:
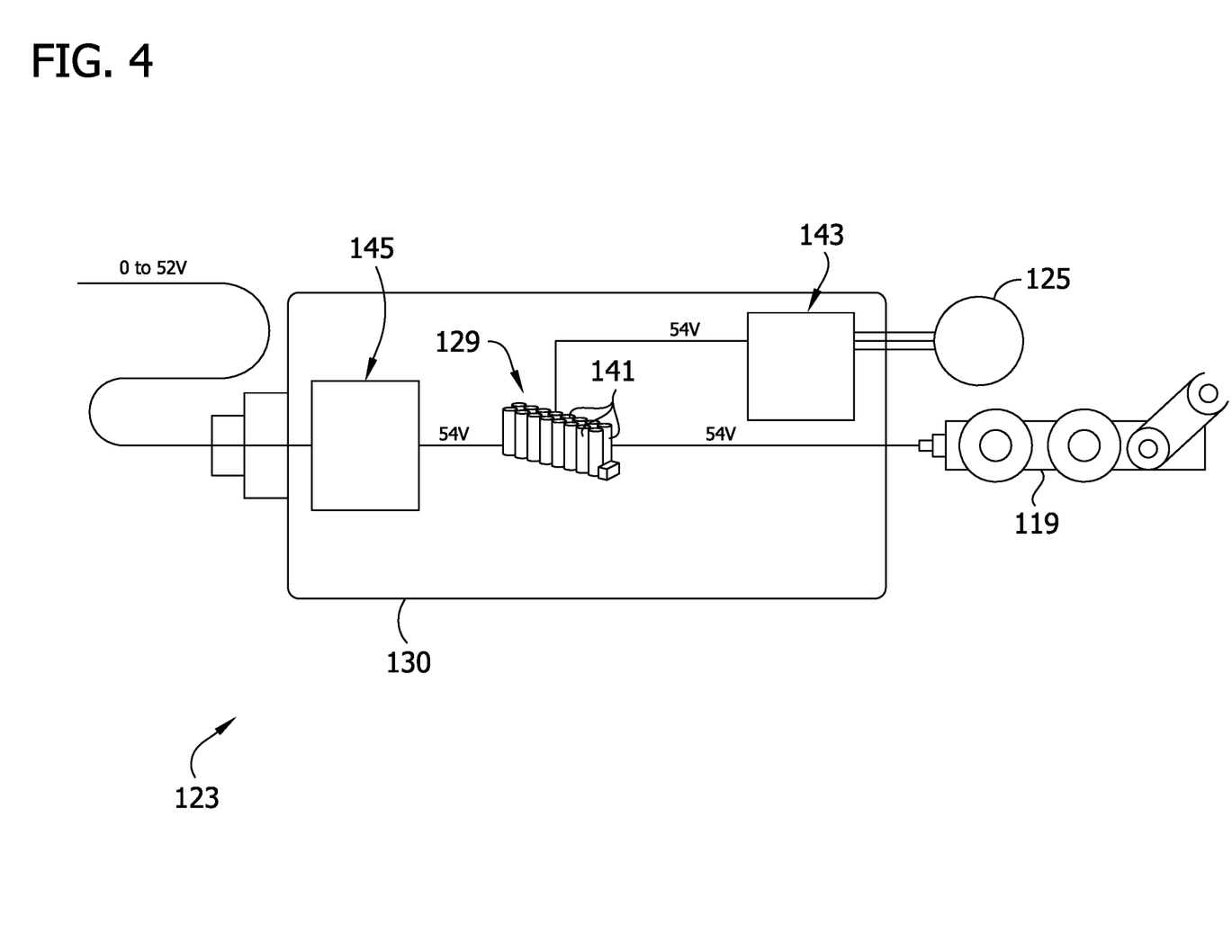
FIG. 4 is a schematic diagram of the power management system.
Figure 5:
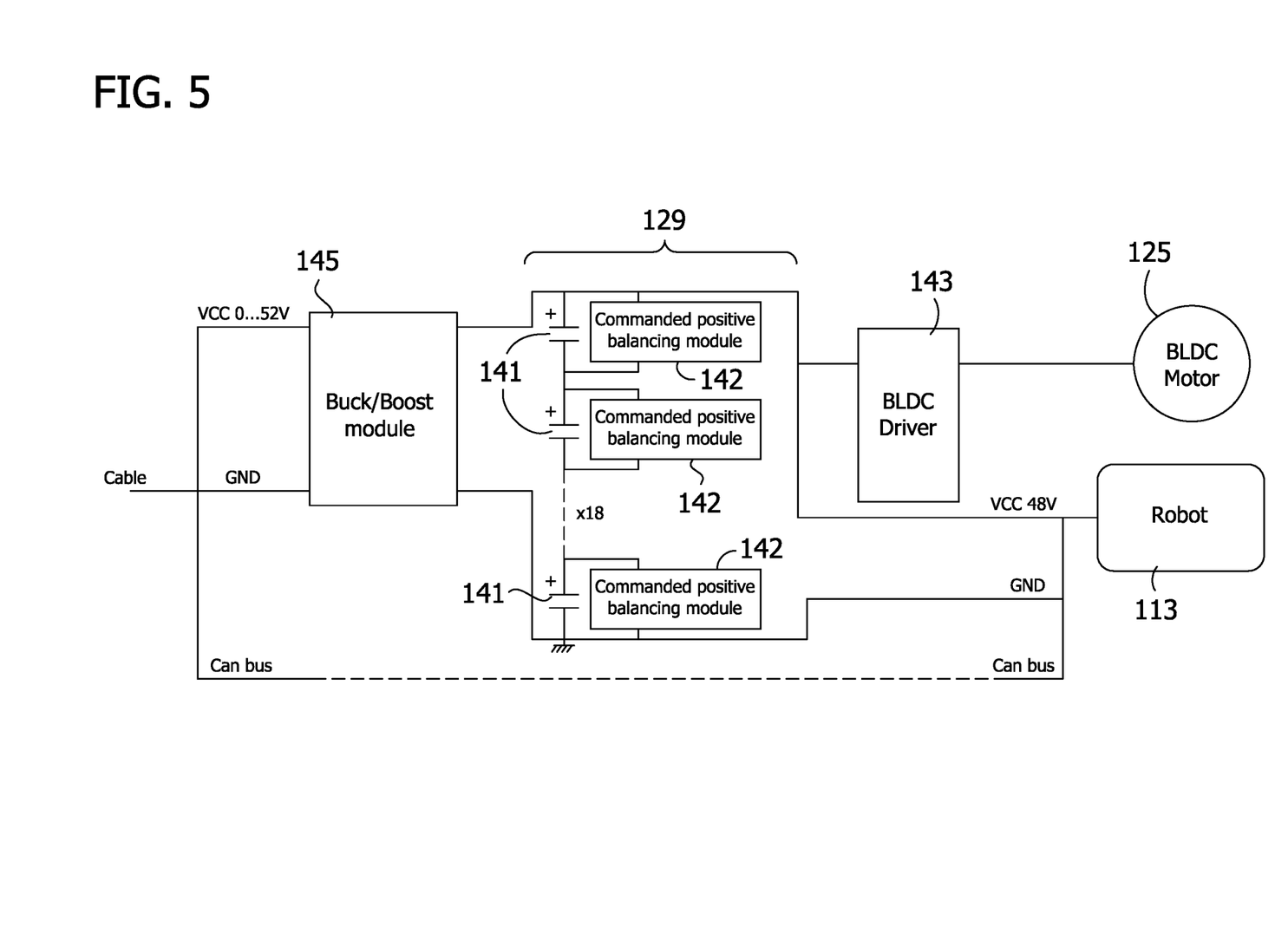
FIG. 5 is a schematic block diagram of the power management system.

Referring to FIGS. 4 and 5, in the illustrated embodiment, the electrical storage device 129 of the power management system 123 comprises a supercapacitor module having one or more supercapacitors 141 received in the housing 130. The illustrated supercapacitor module 129 comprises a plurality of supercapacitors 141 electrically connected to one another in series. For example, in one or more embodiments, the supercapacitor module 129 comprises at least ten supercapacitors 141. In an exemplary embodiment, the supercapacitor module 129 comprises eighteen supercapacitors. Each supercapacitor has a discharge voltage of at least 1.0 V. For example, in one or more embodiments, each supercapacitor 141 has a discharge voltage of 3 V. Suitably, the entire supercapacitor module 129 has a capacity of at least 50 F (e.g., a total capacity of about 100 F). The power management system 123 comprises a dedicated charge controller 142 (FIG. 5) for each of the plurality of supercapacitors 141. Each dedicated charge controller 142 ("Commanded positive balancing module") is configured to monitor a charge of the respective supercapacitor 141 and the charge controllers 142 collectively are configured to balance the charges of the supercapacitors to prevent overcharging of any individual capacitor. In one or more embodiments, the charge controllers 142 are of the resistor type. Moreover, each charge controller 142 includes a maximum point tracking feature to constantly monitor and adjust the current draw to achieve maximum energy.

The power management system 123 further comprises a single DC-to-DC converter 145 connected between the umbilical cord 117 and the supercapacitors 129. In the illustrated embodiment, the converter 145 comprises a buck-boost converter configured to selectively step-down or step-up the voltage of the input current. When the power management system 123 is called upon to deliver power to electrical components other than the cutter 121, the converter 145 operates in a buck mode (e.g., a step-down mode) to step down the voltage of the input current. For example, in the embodiment shown in FIG. 5, the converter 145 is configured to step down the input voltage of 55 V to an output voltage of 48 V DC. The lower-voltage output current flows through the supercapacitor module 129 to charge the supercapacitors 141 when they are not being discharged to power the cutter 121.

The cutter 121 comprises a cutter driver 143 (brushless direct current driver or "BLDC Driver") that is configured to control the delivery of power from the power management system 123 to the cutter motor 125. In one or more embodiments the cutter driver 143 and the converter 145 are integrated into the same printed circuit board. Suitably, the CAN bus isolator and CAN bus transceivers for the first and second CAN busses used to communicate with the power source 115 and the mobile system 113 can likewise be integrated into the same printed circuit board with the cutter driver 143 and the converter 145. It will be understood, however, that separate printed circuit boards can also be used for the components without departing from the scope of the disclosure. The cutter driver 143 is connected to the supercapacitor module 129 such that the supercapacitor module discharges current to the cutter driver 143. In an exemplary embodiment, a bleeder resistor (not shown) is connected in parallel with the output of the supercapacitor module 129 to the cutter driver to quickly discharge the supercapacitor module system after power off. In the illustrated embodiment, when the cutter driver 143 calls for power to the cutter 121, the supercapacitor module 129 discharges current to the cutter driver 143 in an amount sufficient to drive the cutter motor 125 for removing a blockage without stalling. Whenever current is being discharged from the supercapacitor module 129, there is a substantial drop in the voltage of the input current. The converter 145 is configured address this drop in voltage by operating in a buck boost mode to step up the voltage of the input current. This allows other electrical components to be run without interruption, even when the cutter motor 125 is drawing the substantial current required to remove a blockage from a branch conduit C. For example, a camera (not shown) positioned for viewing within the pipe would not have its video transmission interrupted during cutting.

As can be seen, the above-described power management system enables a pipe rehabilitation system to run an efficient electrical cutting tool without requiring a hazardous high voltage line or heavy Siamese cable.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A mobile system for pipe rehabilitation, the mobile system comprising:
   a tractor configured for moving along a main pipe;
   a cutter supported by the tractor for movement with the tractor along the main pipe, the cutter comprising a cutting shaft and a cutting implement mounted on the shaft for cutting, and an electric motor configured to drive rotation of the cutting shaft about a rotational axis such that the cutting shaft can rotate the cutting implement to remove material from within the main pipe; and
   a power management system in electrical communication with at least the cutter, the power management system comprising a supercapacitor module including at least one supercapacitor, the power management system being configured to selectively power the electric motor to drive rotation of the cutting shaft about a rotational axis by discharging current from the supercapacitor module to the cutter.

2. The mobile system as set forth in claim 1, wherein the power management system is configured to connect to a direct current power source that provides an input current having a voltage of less than 60V and to power the electric motor from said input current.

3. The mobile system as set forth in claim 2, further comprising other electronic components supported by the tractor, the power management system being configured to power said other electrical components of the mobile system from said input current.

4. The mobile system as set forth in claim 3, wherein the power management system is configured to power said other electrical components without discharging the supercapacitor module.

5. The mobile system as set forth in claim 4, wherein the power management system comprises a buck-boost converter.

6. The mobile system as set forth in claim 5, wherein the power management system is configured to operate the buck-boost converter to step-up the voltage of the input current when the power management system discharges current from the supercapacitor module to the cutter and wherein the power management system is configured to operate the buck-boost converter to step-down the voltage of the input current when the power management system is not discharging current from the supercapacitor module.

7. The mobile system as set forth in claim 1, wherein the supercapacitor module comprises a plurality of supercapacitors.

8. The mobile system as set forth in claim 7, wherein the power management system comprises a dedicated charge controller for each of the plurality of supercapacitors, each dedicated charge controller being configured to monitor a charge of the respective supercapacitor.

9. The mobile system as set forth in claim 8, wherein the power management system is configured to balance the charges of the plurality of supercapacitors.

10. The mobile system as set forth in claim 7, wherein the supercapacitor module comprises at least ten supercapacitors.

11. The mobile system as set forth in claim 7, wherein each supercapacitor has a discharge voltage of at least 1.0 V.

12. The mobile system as set forth in claim 7, wherein the power management system comprises a single voltage converter configured to charge the plurality of supercapacitors.

13. The mobile system as set forth in claim 1, wherein the supercapacitor module has a capacity of at least 50 F.

14. The mobile system as set forth in claim 1, wherein the power management system comprises a housing configured to be supported on the tractor for movement with the tractor along the main pipe.

15. The mobile system as set forth in claim 14, wherein the tractor comprises a first electrical coupling configured to couple to an umbilical cord for supplying an input current to the mobile system, wherein the power management system comprises a second electrical coupling configured to couple to the first electrical coupling and a third electrical coupling configured to couple to the umbilical cord.

16. The mobile system as set forth in claim 15, wherein the tractor has a front end portion and a rear end portion spaced apart along a longitudinal axis, wherein the first electrical coupling is on the rear end portion and is configured to support the housing in cantilevered relationship with the tractor when the second electrical coupling is coupled to the first electrical coupling.

17. The mobile system as set forth in claim 16, wherein the tractor has a maximum tractor cross-sectional dimension in a plane perpendicular to the longitudinal axis and wherein the housing is configured to have a maximum housing cross-sectional dimension in another plane perpendicular to the longitudinal axis when supported on the tractor, the maximum tractor cross-sectional dimension being greater than the maximum housing cross-sectional dimension.

18. A power management system for providing electrical power to a mobile system configured for pipe rehabilitation, wherein the mobile system comprises a tractor and a cutter, the power management system comprising:
   a housing;
   a first electrical coupling on the housing configured to electrically connect the power management system to an umbilical cord carrying an input current;
   a second electrical coupling on the housing configured to couple to the mobile system for providing a drive current to at least the cutter of the mobile system; and
   a supercapacitor module received in the housing, the supercapacitor module including at least one supercapacitor, the power management system being configured to charge the supercapacitor module with the input current and selectively power the cutter by discharging current from the supercapacitor module to the cutter.

19. The power management system as set forth in claim 18, wherein the input current has a voltage of less than 60V and the power management system is configured to power the cutter via the input current.

20. A mobile system for pipe rehabilitation, the mobile system comprising:
- a tractor configured for moving along a main pipe;
- a cutter supported by the tractor for movement with the tractor along the main pipe, the cutter comprising a cutting shaft and a cutting implement mounted on the shaft configured for cutting, and an electric motor configured to drive rotation of the cutting shaft about a rotational axis such that the cutting implement when mounted on the cutting shaft can remove material from within the main pipe; and
- a power management system in electrical communication with at least the cutter, the power management system configured to connect to a direct current power source that provides an input current having a voltage of less than 60V and to power the electric motor from said input current.

* * * * *

UNITED STATES PATENT AND TRADEMARK OFFICE
CERTIFICATE OF CORRECTION

| | | |
|---|---|---|
| PATENT NO. | : 12,123,537 B2 | Page 1 of 1 |
| APPLICATION NO. | : 17/669067 | |
| DATED | : October 22, 2024 | |
| INVENTOR(S) | : DeKytspotter et al. | |

It is certified that error appears in the above-identified patent and that said Letters Patent is hereby corrected as shown below:

On the Title Page

Item (12), delete "DeKyspotter" insert --DeKytspotter--

Item (72), delete "DeKyspotter" insert --DeKytspotter--

Signed and Sealed this
Eighteenth Day of March, 2025

Coke Morgan Stewart
*Acting Director of the United States Patent and Trademark Office*